United States Patent
Jaishankar et al.

(10) Patent No.: US 10,883,039 B2
(45) Date of Patent: Jan. 5, 2021

(54) INJECTION FLUIDS FOR OIL RECOVERY AND METHODS OF MAKING AND USING THE SAME

(71) Applicant: ExxonMobil Research and Engineering Company, Annandale, NJ (US)

(72) Inventors: Aditya Jaishankar, Clinton, NJ (US); Mohsen S. Yeganeh, Hillsborough, NJ (US); Alex G. K. Lee, Colleyville, TX (US); Daniel P. Cherney, Hampton, NJ (US); Mobae Afeworki, Phillipsburg, NJ (US); Sartaj S. Ghai, Luanda (AO)

(73) Assignee: ExxonMobil Research and Engineering Company, Annandale, NJ (US)

( * ) Notice: Subject to any disclaimer, the term of this patent is extended or adjusted under 35 U.S.C. 154(b) by 77 days.

(21) Appl. No.: 15/790,254

(22) Filed: Oct. 23, 2017

(65) Prior Publication Data
US 2018/0134943 A1   May 17, 2018

Related U.S. Application Data

(60) Provisional application No. 62/422,102, filed on Nov. 15, 2016.

(51) Int. Cl.
C09K 8/588 (2006.01)
E21B 43/16 (2006.01)
C09K 8/584 (2006.01)

(52) U.S. Cl.
CPC .............. *C09K 8/588* (2013.01); *C09K 8/584* (2013.01); *E21B 43/16* (2013.01)

(58) Field of Classification Search
CPC ...................................................... C09K 8/588
See application file for complete search history.

(56) References Cited

U.S. PATENT DOCUMENTS

| | | | |
|---|---|---|---|
| 4,360,061 A * | 11/1982 | Canter | B01F 17/00 166/270.1 |
| 4,432,881 A | 2/1984 | Evani | |
| 4,532,052 A * | 7/1985 | Weaver | C09K 8/508 166/275 |
| 4,632,185 A * | 12/1986 | Moradi-Araghi | C09K 8/588 166/270.1 |
| 4,702,319 A | 10/1987 | Bock et al. | |
| 4,814,096 A | 3/1989 | Evani | |
| 5,089,578 A | 2/1992 | Valint et al. | |
| 7,427,583 B2 | 9/2008 | Couillet et al. | |

(Continued)

OTHER PUBLICATIONS

Muller et al. Role of Naphthenic Acids in Emulsion Tightness for a Low Total Acid Number, 2008.*

(Continued)

*Primary Examiner* — Angela M DiTrani Leff
*Assistant Examiner* — Avi T Skaist
(74) *Attorney, Agent, or Firm* — Andrew T. Ward; Priya G. Prasad; Leandro Arechederra, III

(57) ABSTRACT

Viscous aqueous injections fluids including polymers having hydrophilic moieties and hydrophobic groups and at least one of crude oil emulsions and amphiphilic diblock copolymers are provided herein. Methods of making the aqueous injection fluids, and methods of using the aqueous injection fluids for oil recovery are also provided.

12 Claims, 9 Drawing Sheets

(56) References Cited

U.S. PATENT DOCUMENTS

| | | | | |
|---|---|---|---|---|
| 2011/0309001 A1* | 12/2011 | Soane | ............... | C09K 8/604 |
| | | | | 208/390 |
| 2015/0075798 A1* | 3/2015 | Tang | ............... | C09K 8/588 |
| | | | | 166/307 |
| 2015/0197686 A1* | 7/2015 | Mason | ............... | C09K 8/605 |
| | | | | 166/278 |

OTHER PUBLICATIONS

Taylor et al., "Water-soluble hydrophobically associating polymers for improved oil recover: A literature review", Journal of Petroleum Science and Engineering, 1998, pp. 265-280, vol. 19, iss. 3, Elsevier.
Anton et al., "Nano-emulsions and Micro-emulsions: Clarifications of the Critical Differences", Pharmaceutical Research, 2011, 28.5, pp. 978-985.

* cited by examiner

INJECTION FLUIDS FOR OIL RECOVERY AND METHODS OF MAKING AND USING THE SAME

CROSS-REFERENCE TO RELATED APPLICATIONS

This application claims the benefit of U.S. Provisional Application No. 62/422,102, filed on Nov. 15, 2016, the entire contents of which are incorporated herein by reference.

FIELD

This invention relates to aqueous injections fluids, methods of making the aqueous injection fluids, and methods of using the aqueous injection fluids for oil recovery.

BACKGROUND

The recovery of petroleum from oil-bearing reservoirs initially involves drilling into the reservoir and utilizing the natural pressure forces for production, also known as primary recovery. However, these primary recovery methods only recover a minor portion of the oil present in the reservoir resulting in a majority of the original oil-in-place in the reservoirs remaining unrecovered. Consequently, further enhanced methods of oil recovery have been developed, known as secondary and tertiary recovery. Secondary recovery typically involves fluid injection, such as gas flooding (e.g., air, natural gas, carbon dioxide and the like) and water flooding processes. For example, gas and/or water may be injected to sweep or recover oil from the oil reservoir by increasing the reservoir's pressure. Such secondary recovery methods have their limits including poor sweep efficiency caused by injection fluid (e.g., water) having a higher mobility than the oil-in-place resulting in viscous fingering of the injection fluid through the oil and a reduction in recovery. Thus, over half of the oil-in-place may still remain in the reservoir following secondary recovery necessitating further tertiary oil recovery.

Typically, tertiary oil recovery methods seek to increase the mobility of the oil in order to increase extraction. For example, thermal methods may heat the oil, thus reducing the oil's viscosity to make it more easily extracted. Steam injection may also be performed to extract further oil. Another tertiary recovery technique involves use of aqueous injection fluids comprising polymers to increase viscosity of the injection fluid to better mobilize the oil for extraction, reduce fingering and improve sweep efficiency. However, conventional approaches involve using high molecular weight polymers, such as xanthan or hydrolyzed polyacrylamide (HPAM). These high molecular weight polymers (e.g., several million Da) with their larger coil size suffer from undesirable shear degradation while passing through pumps, chokes and screens during injection even before the injection fluid enters the reservoir, which can consume significant amounts of the injected polymer. Therefore, these high molecular weight polymers may show a larger loss in viscosity compared to their initial viscosity when not subjected to shear stress. Consequently, excess polymer may be added to achieve the desired viscosity in the reservoir to compensate for the shear degradation of the polymers during the recovery leading to increased costs for more and more polymer. While lower molecular weight polymers may be used to decrease the problem of shear degradation, increased concentrations of the lower molecular weight polymers are needed for increasing the viscosity of the injection fluid, which also results in increased costs. Furthermore, conventional techniques using polymer-containing injection fluids can require use of more than one injection fluid following injection of the polymer-containing injection fluid, such as a brine fluid or polymer post-flush fluid.

Also, polymers such as xanthan or HPAM, can lose viscosification when used in oil reservoirs having high salinity concentrations. More specifically, such typical high molecular weight polymers contain charges along their backbone to increase hydrodynamic size for increasing viscosity. However, when under high salinity conditions, the electrostatic charges on the polymer backbone may be screened in the presence of salt, which can cause chain collapse and loss of viscosification.

Therefore, there is a need for shear stable, single injection fluid compositions which can withstand changes in applied shear rate as it is pumped into the oil reservoir and also can improve sweep efficiency and oil recovery from the reservoir even under high salinity conditions. Methods of making and using such injection fluids are also needed.

SUMMARY

It has been found that shear stable injection fluids comprising a polymer having hydrophilic moieties and hydrophobic groups, and at least one of an aqueous crude oil emulsion with a basic compound or an amphiphilic diblock copolymer can be achieved. Further, methods of using such injection fluids for recovering oil with improved sweep efficiency and oil recovery, even in oil reservoirs with a high salinity concentration, can be achieved.

Thus, in one aspect, embodiments of the invention provide an aqueous injection fluid. The aqueous injection fluid comprises: a polymer comprising hydrophilic moieties and a plurality of hydrophobic groups; an aqueous crude oil emulsion, wherein the crude oil has a total acid number (TAN) greater than about 0.4 as measured according to ASTM D664; and a basic compound.

In still another aspect, embodiments of the invention provide another aqueous injection fluid. The aqueous injection fluid comprising: a polymer comprising hydrophilic moieties and a plurality of hydrophobic groups; and an amphiphilic diblock copolymer.

In still another aspect, embodiments of the invention provide a method of preparing an aqueous injection fluid composition. The method comprises: mixing crude oil with a basic aqueous solution to form a crude oil emulsion; and adding a polymer comprising hydrophilic moieties and a plurality of hydrophobic groups to the crude oil emulsion to form the aqueous injection fluid.

In still another aspect, embodiments of the invention provide a method for recovering oil from an oil reservoir. The method comprises: introducing an aqueous injection fluid into the oil reservoir to force the oil into a producing well for recovery, wherein the aqueous injection fluid comprises: a polymer comprising hydrophilic moieties and a plurality of hydrophobic groups; and at least one of: (i) an aqueous crude oil emulsion and a basic compound, wherein the crude oil has a TAN greater than about 0.4 as measured according to ASTM D664; and (ii) an amphiphilic diblock copolymer.

In still another aspect, embodiments of the invention provide a method for increasing viscosity of an aqueous injection fluid composition, wherein the method comprises: mixing crude oil with a basic aqueous solution to form a crude oil emulsion; and adding a polymer comprising hydrophilic moieties and a plurality of hydrophobic groups to the crude oil emulsion to form the aqueous injection fluid having a viscosity of about 10 cps to about 1,000 cps.

Other embodiments, including particular aspects of the embodiments summarized above, will be evident from the detailed description that follows.

DETAILED DESCRIPTION OF THE INVENTION

Figure 1:
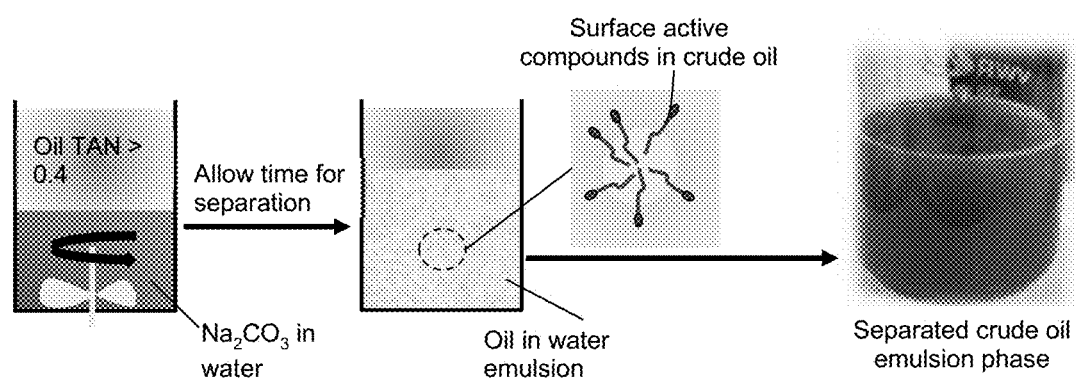
FIG. 1 illustrates a schematic for preparation of an aqueous crude oil emulsion.

In various aspects of the invention, catalysts and methods for preparing catalysts are provided.

I. DEFINITIONS

For purposes of this invention and the claims hereto, the numbering scheme for the Periodic Table Groups is according to the IUPAC Periodic Table of Elements.

The term "and/or" as used in a phrase such as "A and/or B" herein is intended to include "A and B", "A or B", "A", and "B".

The terms "substituent", "radical", "group", and "moiety" may be used interchangeably.

As used herein, and unless otherwise specified, the term "$C_n$" means hydrocarbon(s) having n carbon atom(s) per molecule, wherein n is a positive integer.

As used herein, and unless otherwise specified, the term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n.

As used herein, and unless otherwise specified, the term "alkyl" refers to a saturated hydrocarbon radical having from 1 to 12 carbon atoms (i.e. $C_1$-$C_{12}$ alkyl), particularly from 1 to 8 carbon atoms (i.e. $C_1$-$C_8$ alkyl), particularly from 1 to 6 carbon atoms (i.e. $C_1$-$C_6$ alkyl), and particularly from 1 to 4 carbon atoms (i.e. $C_1$-$C_4$ alkyl). Examples of alkyl groups include, but are not limited to, methyl, ethyl, propyl, butyl, pentyl, hexyl, heptyl, octyl, decyl, and so forth. The alkyl group may be linear, branched or cyclic. "Alkyl" is intended to embrace all structural isomeric forms of an alkyl group. For example, as used herein, propyl encompasses both n-propyl and isopropyl; butyl encompasses n-butyl, sec-butyl, isobutyl and tert-butyl and so forth. As used herein, "$C_1$ alkyl" refers to methyl (—$CH_3$), "$C_2$ alkyl" refers to ethyl (—$CH_2CH_3$), "$C_3$ alkyl" refers to propyl (—$CH_2CH_2CH_3$) and "$C_4$ alkyl" refers to butyl (e.g. —$CH_2CH_2CH_2CH_3$, —$(CH_3)CHCH_2CH_3$, —$CH_2CH(CH_3)_2$, etc.). Further, as used herein, "Me" refers to methyl, and "Et" refers to ethyl, "i-Pr" refers to isopropyl, "t-Bu" refers to tert-butyl, and "Np" refers to neopentyl.

As used herein, and unless otherwise specified, the term "aryl" refers to any monocyclic or polycyclic cyclized carbon radical containing 6 to 14 carbon ring atoms, wherein at least one ring is an aromatic hydrocarbon. Examples of aryls include, but are not limited to phenyl, naphthyl, pyridinyl, and indolyl.

As used herein, and unless otherwise specified, the term "aralkyl" refers to an alkyl group substituted with an aryl group. The alkyl group may be a $C_1$-$C_{10}$ alkyl group, particularly a $C_1$-$C_6$, particularly a $C_1$-$C_4$ alkyl group, and particularly a $C_1$-$C_3$ alkyl group. Examples of aralkyl groups include, but are not limited to phenylmethyl, phenylethyl, and naphthylmethyl. The aralkyl may comprise one or more heteroatoms and be referred to as a "heteroaralkyl." Examples of heteroatoms include, but are not limited to, nitrogen (i.e., nitrogen-containing heteroaralkyl), oxygen (i.e., oxygen-containing heteroaralkyl), and/or sulfur (i.e., sulfur-containing heteroaralkyl). Examples of heteroaralkyl groups include, but are not limited to, pyridinylethyl, indolylmethyl, furylethyl, and quinolinylpropyl.

As used herein, and unless otherwise specified, the term "halogen" or "halide" refers to flourine (F), chlorine (Cl), bromine (Br) and iodine (I).

As used herein, and unless otherwise specified, the term "haloalkyl" refers to an alkyl moiety as described herein in which one or more of the hydrogen atoms has been replaced by a halogen atom. For example, haloalkyls include, but are not limited to, —$CZ_m$, —$(CH_2)_p(CZ_2)_qCZ_3$, wherein m is 1 to 3, p is zero to 20, q is zero to 20 and each Z is independently F, Cl, Br or I, etc. Examples of haloalkyls include, but are not limited to, chloromethyl, fluoromethyl, bromomethyl, trifluoromethyl, dichloromethyl, 2-chloro-2-fluoroethyl, 6,6,6-trichlorohexyl and the like.

As used herein, the term "hydrophobic" refers to substance or a moiety, which lacks an affinity for water. That is, a hydrophobic substance or moiety tends to substantially repel water, is substantially insoluble in water, does not substantially mix with or be wetted by water or to do so only to a very limited degree and/or does not absorb water or, again, to do so only to a very limited degree.

As used herein, the term "hydrophilic" refers to substance or a moiety, which has an affinity for water. That is, a hydrophilic substance or moiety tends to substantially attract water, is substantially soluble in water, and/or is substantially miscible with or wetted by water.

As used herein, the term "lipophilic" refers to a substance or moiety which has an affinity for oil and/or hydrocarbons. That is, a lipophilic substance or moiety tends to substantially attract oil and/or hydrocarbons, is substantially soluble in oil and/or hydrocarbons, and/or is substantially miscible with oil and/or hydrocarbons. A lipophilic substance or moiety may also have greater solubility in non-polar solvents.

As used herein, the term "amphiphilic" refers to a molecule containing both hydrophilic and lipophilic moieties.

As used herein, "molecular weight" refers to the weight average molecular weight (Mw). Unless otherwise noted, all molecular weight units are g/mol.

II. AQUEOUS INJECTION FLUID

The invention relates to various aqueous injection fluids suitable for use in oil recovery techniques. In particular, the aqueous injection fluids described herein have suitable ranges of viscosity for extracting oil and can advantageously withstand harsh conditions present in oil reservoirs during oil recovery, e.g., large changes in applied shear rate as it is pumped from the surface to the oil reservoirs (e.g., as high as $10^7$ s$^{-1}$) without a significant loss of viscosity. In a first embodiment, an aqueous injection fluid is provided comprising: a polymer comprising hydrophilic moieties and a plurality of hydrophobic groups; an aqueous crude oil emulsion; and a basic compound. In alternative embodiments, aqueous injection fluids are provided which comprise an amphiphilic diblock copolymer in place of or in addition to the crude oil emulsion and the basic compound.

II.A. Polymer with Hydrophilic Moieties and Hydrophobic Groups

To increase viscosity of an aqueous injection fluid, polymers comprising hydrophilic moieties and a plurality of hydrophobic groups may be used. The hydrophobic groups may be present as pendant groups or side groups on the hydrophilic moieties. Suitable hydrophilic moieties include those which are sufficiently water-soluble and readily undergo addition polymerization to form polymers which are water-soluble. Such hydrophilic moieties include, but are not limited to, ethylene oxide, an ethylenically unsaturated amide, an N-substituted derivative of the ethylenically unsaturated amide, an ethylenically unsaturated carboxylic acid, a sulfoalkyl ester of an unsaturated carboxylic acid, an aminoalkyl ester of an unsaturated carboxylic acid, a diallyl ammonium compound, a vinyl heterocyclic amide, a vinylaryl sulfonate, a monosaccharide, a urethane, salts of the aforementioned monomers and combinations thereof. Exemplary ethylenically unsaturated amides include, but are not limited to acrylamide, methacrylamide and fumaramide and their N-substituted derivatives, such as 2-acrylamido-2-methylpropane sulfonic acid (AMPS), N-(dimethylaminomethyl)acrylamide as well as N-(trimethylammoniummethyl)acrylamide chloride and N-(trimethylammoniumpropyl)methacrylamide chloride. The acrylamide may include hydrolyzed acrylamide and non-hydrolyzed acrylamide. Exemplary ethylenically unsaturated carboxylic acids include but are not limited to acrylic acid, methacrylic acid, itaconic acid and fumaric acid. Exemplary sulfoalkyl esters of unsaturated carboxylic acid include, but are not limited to 2-sulfoethyl methacrylate. Exemplary aminoalkyl esters of unsaturated carboxylic acids include, but are not limited to 2-aminoethyl methacrylate. Exemplary diallyl ammonium compounds include, but are not limited to diallyl dimethyl ammonium chloride. Exemplary vinyl heterocyclic amides include, but are not limited to vinyl pyrrolidone. Exemplary vinylaryl sulfonates include, but are not limited to vinylbenzyl sulfonate. Exemplary monosaccharides include, but are not limited to cellulose, glucose, fructose, galactose, mannose and gulose. In particular, the hydrophilic moieties may be selected from the group consisting of urethanes, saccharides, hydrolyzed acrylamide, non-hydrolyzed acrylamide, ethylene oxide and combinations thereof.

Suitable hydrophobic groups include those which are substantially water insoluble, such as, but are not limited to alkyls, aryls, aralkyls, alkylphenols, haloalkyls, quaternary ammonium halides and combinations thereof. Exemplary alkyls include $C_4$-$C_{20}$ alkyls or $C_8$-$C_{18}$ alkyls. Exemplary aryls include phenyl, naphthyl, pyridinyl, and indolyl. Exemplary aralkyls include $C_1$-$C_{10}$ alkyls, such as, but not limited to phenylmethyl, phenylethyl, phenylbutyl, phenylpropyl, phenylpentyl, naphthylmethyl and the like. Exemplary alkylphenols include $C_1$-$C_{10}$ alkyls, such as, but not limited to methylphenol, ethylphenol, propylphenol, butylphenol, amylphenol, heptylphenol, octylphenol, nonylphenol, and dodecylphenol. Exemplary haloalkyls include one or more carbons or four or more carbons and one to three halides, such as, but not limited to chloromethyl, chloropropyl, chlorobutyl, fluoromethyl, fluoropropyl, fluorobutyl, flurobromomethyl, trifluoromethyl, difluoromethyl, dichloromethyl, 2-chloro-2-fluoroethyl, 6,6,6-trichlorohexyl and the like. Exemplary quaternary ammounium halides include benzalkonium chloride, benzethonium chloride, methylbenzethonium chloride, cetalkonium chloride, cetylpyridinium chloride, cetrimonium chloride, cetrimonium bromide, cetrimide, dofanium chloride, tetraethylammonium bromide, didecyldimethylammonium chloride and domiphen bromide.

The aforementioned polymers containing hydrophilic moieties and a plurality of hydrophobic groups may be prepared by copolymerizing the hydrophilic moieties with the hydrophobic groups by any of the conventional polymerization techniques or by any other suitable techniques. See, e.g., U.S. Pat. Nos. 4,432,881; 4,814,096; 4,702,319; and 7,427,583.

Advantageously, the polymers described herein can have a lower molecular weight, which is especially useful for oil reservoirs with lower permeability (e.g., permeability between about 1 millidarcy and about 100 millidarcy. Higher molecular weight polymers (e.g., hydrolyzed polyacrylamide, xanthan gum) can be problematic due to their large coil size, which can cause such high molecular weight polymers to become trapped in the pores of lower permeability reservoirs leading to reservoir damage. Thus, the higher molecular weight polymers may be limited to use in injection fluids for high permeability reservoirs (e.g., greater than about 100 millidarcy).

Thus, in various aspects, the polymer described herein may have a molecular weight of at least about 1,000 g/mol, at least about 5,000 g/mol, at least about 10,000 g/mol, at least about 25,000 g/mol, at least about 50,000 g/mol, at least about 75,000 g/mol, at least about 100,000 g/mol, at least about 150,000 g/mol, at least about 200,000 g/mol, at least about 250,000 g/mol, at least about 300,000 g/mol, at least about 350,000 g/mol, at least about 400,000 g/mol, at least about 450,000 g/mol, at least about 500,000 g/mol, at least about 550,000 g/mol, at least about 600,000 g/mol, at least about 650,000 g/mol, at least about 700,000 g/mol, at least about 750,000 g/mol, at least about 800,000 g/mol, at least about 850,000 g/mol, at least about 900,000 g/mol, at least about 950,000 g/mol, at least about 1,000,000 g/mol, at least about 1,100,000 g/mol, at least about 1,200,000 g/mol, at least about 1,300,000 g/mol, at least about 1,400,000 g/mol, at least about 1,500,000 g/mol, at least about 1,600,000 g/mol, at least about 1,700,000 g/mol, at least about 1,800,000 g/mol, at least about 1,900,000 g/mol, at least about 2,000,000 g/mol, at least about 3,000,000 g/mol, at least about 4,000,000 g/mol, or about 5,000,000 g/mol. Additionally or alternatively, the polymer described herein may have a molecular weight of about 1,000 g/mol to about 5,000,000 g/mol, about 1,000 g/mol to about 2,000,000 g/mol, about 1,000 g/mol to about 1,000,000 g/mol, about 1,000 g/mol to about 500,000 g/mol, about 10,000 g/mol to about 5,000,000 g/mol, about 10,000 g/mol to about 4,000, 000 g/mol, about 10,000 g/mol to about 3,000,000 g/mol, about 10,000 g/mol to about 2,000,000 g/mol, about 10,000 g/mol to about 1,500,000 g/mol, about 10,000 g/mol to about 1,000,000 g/mol, about 10,000 g/mol to about 900,000 g/mol, about 10,000 g/mol to about 800,000 g/mol, about 10,000 g/mol to about 700,000 g/mol, about 10,000 g/mol to about 600,000 g/mol, about 10,000 g/mol to about 500,000 g/mol, about 10,000 g/mol to about 400,000 g/mol, about 10,000 g/mol to about 300,000 g/mol, about 10,000 g/mol to about 200,000 g/mol, about 10,000 g/mol to about 100,000 g/mol, about 10,000 g/mol to about 75,000 g/mol, about 10,000 g/mol to about 50,000 g/mol, or about 10,000 g/mol to about 25,000 g/mol. In particular, the polymer described herein may have a molecular weight of about 1,000 g/mol to about 2,000,000 g/mol, about 10,000 g/mol to about 2,000,000 g/mol or about 10,000 g/mol to about 1,000,000 g/mol.

Further, the polymer describe herein may be present in the aqueous injection fluid in advantageously lower concentrations. For example, the polymer may be present in an amount of at least about 0.02 wt %, at least about 0.05 wt %, at least about 0.07 wt %, at least about 0.10 wt %, at least about 0.20 wt %, at least about 0.30 wt %, at least about 0.40 wt %, at least about 0.50 wt %, at least about 0.60 wt %, at least about 0.70 wt %, at least about 0.80 wt %, at least about 0.90 wt %, at least about 1.0 wt %, at least about 2.0 wt %, at least about 3.0 wt %, at least about 4.0 wt %, or about 5.0 wt %. Additionally or alternatively, the polymer may be present in an amount of 0.02 wt % to about 5.0 wt %, about 0.02 wt % to about 3.0 wt %, about 0.02 wt % to about 1.0 wt %, about 0.02 wt % to about 0.50 wt %, 0.05 wt % to about 5.0 wt %, about 0.05 wt % to about 3.0 wt %, about 0.05 wt % to about 1.0 wt %, about 0.05 wt % to about 0.90 wt %, about 0.05 wt % to about 0.80 wt %, about 0.05 wt % to about 0.70 wt %, about 0.05 wt % to about 0.60 wt %, about 0.05 wt % to about 0.50 wt %, about 0.05 wt % to about 0.40 wt %, about 0.05 wt % to about 0.30 wt %, about 0.05 wt % to about 0.20 wt %, or about 0.05 wt % to about 0.10 wt %. In particular, the polymer may be present in an amount of about 0.02 wt % to about 3.0 wt %, about 0.05 wt % to about 2.0 wt %, about 0.05 wt % to about 1.0 wt % or about 0.07 wt % to about 0.80 wt %.

II.B. Crude Oil Emulsion

In addition to the polymer, the aqueous injection fluid may further include an aqueous crude oil emulsion. Without being bound by theory, it is believed that the combination of the polymer and the crude oil emulsion achieves increased viscosity of the aqueous injection fluid due to the physical hydrophobic bonds between the hydrophobic groups on the polymer and the hydrophobic nodes present in the crude oil. Advantageously, these hydrophobic bonds are reversible, which render the present aqueous injection fluid less susceptible to shear degradation as the fluid is pumped into the reservoir. Thus, the aqueous injection fluid described herein may be shear-stable and have enhanced viscosity which can improve sweep efficiency.

The crude oil present in the crude oil emulsion has a suitable total acid number (TAN) as measured by ASTM D664 whereby the acidic molecules (e.g., naphthenic acids between 200 g/mol and 1000 g/mol) present in the crude oil may act similarly to a surfactant when in the presence of a base. For example, the crude oil present in the crude oil emulsion has a TAN as measured by ASTM D664 of greater than about 0.4, at least about 0.5, at least about 0.6, at least about 0.7, at least about 0.8, at least about 0.9, at least about 1.0, at least about 1.1, at least about 1.2, at least about 1.3, at least about 1.4, at least about 1.5, at least about 1.6, at least about 1.7, at least about 1.8, at least about 1.9, at least about 2.0, at least about 2.5, at least about about 3.0, at least about 3.5, at least about 4.0, at least about 4.5 or about 5.0. In particular, the crude oil present in the crude oil emulsion has a TAN as measured by ASTM D664 of greater than about 0.4 or at least about 1.5. Additionally or alternatively, the crude oil present in the crude oil emulsion has a TAN as measured by ASTM D664 of greater than about 0.4 to about 5.0, greater than about 0.4 to about 4.0, greater than about 0.4 to about 3.0, greater than about 0.4 to about 2.5, greater than about 0.4 to about 2.0, or greater than about 0.4 to about 1.8. Examples of suitable crude oils include, but are not limited to, Alba, Doba, Iokele, and/or Grane.

In various aspects, the crude oil emulsion may be a microemulsion and/or a macroemulsion. Thus, the crude oil emulsion may comprise crude oil droplets having an average diameter of at least about 1 nm, at least about 5 nm, at least about 10 nm, at least about 50 nm, at least about 100 nm, at least about 500 nm, at least about 1,000 nm (1 µm), at least about 5,000 nm (5 µm), at least about 10,000 nm (10 µm), at least about 50,000 nm (50 µm), at least about 100,000 nm (100 µm), about 500,000 nm (500 µm), and combinations thereof. Additionally or alternatively, the crude oil emulsion may comprise crude oil droplets having an average diameter of about 1 nm to about 500,000 nm (500 µm), about 1 nm to about 100,000 nm (100 µm), about 1 nm to about 50,000 nm (50 µm), about 1 nm to about 100 nm, about 10 nm to about 50 nm, about 10 nm to about 500,000 nm (500 µm), about 10 nm to about 100,000 nm (100 µm), about 10 nm to about 50,000 nm (50 µm), or about 1,000 nm (1 µm) to about 100,000 nm (100 µm).

Further, in combination with the polymer, the crude oil may be present in the aqueous injection fluid in an amount of at least about 0.05 wt %, at least about 0.07 wt %, at least about 0.10 wt %, at least about 0.20 wt %, at least about 0.30 wt %, at least about 0.40 wt %, at least about 0.50 wt %, at least about 0.60 wt %, at least about 0.70 wt %, at least about 0.80 wt %, at least about 0.90 wt %, at least about 1.0 wt %, at least about 2.0 wt %, at least about 3.0 wt %, at least about 4.0 wt %, or about 5.0 wt %. Additionally or alternatively, in combination with the polymer, the crude oil may be present in an amount of 0.05 wt % to about 5.0 wt %, about 0.05 wt % to about 3.0 wt %, about 0.05 wt % to about 1.0 wt %, about 0.05 wt % to about 0.50 wt %, 0.10 wt % to about 5.0 wt %, about 0.10 wt % to about 3.0 wt %, about 0.10 wt % to about 1.0 wt %, about 0.10 wt % to about 0.90 wt %, about 0.10 wt % to about 0.80 wt %, about 0.10 wt % to about 0.70 wt %, about 0.10 wt % to about 0.60 wt %, about 0.10 wt % to about 0.50 wt %, about 0.10 wt % to about 0.40 wt %, about 0.10 wt % to about 0.30 wt %, or about 0.10 wt % to about 0.20 wt %. In particular, the crude oil may be present in an amount of about 0.05 wt % to about 3.0 wt %, about 0.05 wt % to about 2.0 wt %, about 0.10 wt % to about 1.0 wt % or about 0.10 wt % to about 0.80 wt %. In one embodiment, the polymer may be present in an amount of about 0.05 wt % to about 1.0 wt % and the crude oil may be present in an amount about 0.10 wt % to about 1.0 wt %.

In certain variations, no further surfactant agent may be present in the aqueous injection fluid besides the aqueous crude oil emulsion. Exemplary surfactant agents include, but are not limited to nonionic surfactants, such as alkyl polyethyleneoxy compounds and reaction products of ethylene oxide or mixtures of ethylene oxide and higher alkylene oxide with active hydrogen compounds such as phenols, alcohols, carboxylic acids and amines, e.g., alkylphenoxyethyleneoxy ethanols; anionic substituted polyethyleneoxy compounds; alkyl ethoxy propoxy sulfates; salts of long chain carboxylates such as potassium oleate, sodium laurate, potassium stearate, potassium caprolate, sodium palmatate and the like; alkali metal alkylbenzene sulfonates such as sodium nonylbenzene sulfonate and potassium dodecylbenzene sulfonate; alkali metal alkyl sulfates such as sodium dodecyl sulfate and alkali metal dialkyl sulfosuccinates such as sodium dihexyl sulfosuccinate and sodium dioctyl sulfosuccinate; salts of resin acids such as abietic acid and dihydroabietic acid; cationic surfactants such as alkyl ammonium or quaternary ammonium salts, e.g., dodecyl ammonium hydrochloride, dodecyl trimethyl quaternary ammonium chloride and the like, and ethoxylated fatty amines; oligomeric surfactants, such as ammonium and alkali metal salts of functionalized oligomers; and polymerizable surfactants, such as sodium salts of 9- and 10-(acrylylamido)stearic acid and the like. Alternatively, the aqueous injection fluid may further comprise one or more of the surfactant agents described above.

II.C. Basic Compound

Any suitable basic compound may be present in the aqueous injection fluid along with the crude oil emulsion so as to ionize the acid molecules present in the crude oil such that they may act as surfactants and maintain stability of the crude oil emulsion.

Exemplary bases can include, but are not limited to, alkali metal hydroxides, carbonates, bicarbonates, ammonium salts and amines. Suitable bases include, but are not limited to, sodium hydroxide, potassium hydroxide, lithium hydroxide, sodium carbonate, pyridine, pyrrole, piperazine, pyrrolidine, piperidine, picoline, monoethanolamine, diethanolamine, dimethylmonoethanolamine, monomethyldiethanolamine, triethanolamine, diazabicyclooctane, diazabicyclononane, diazabicycloundecene, tetramethylammonium hydroxide, tetraethylammonium hydroxide, tetrapropylammonium hydroxide, tetrabutylammonium hydroxide, ammonia, ammonium hydroxide, methylamine, ethylamine, propylamine, butylamine, pentylamine, hexylamine, octylamine, nonylamine, decylamine, N,N-dimethylamine, N,N-diethylamine, N,N-dipropylamine, N,N-dibutylamine, trimethylamine, triethylamine, tripropylamine, tributylamine, cyclohexylamine, trimethylimidine, 1-amino-3-methylbutane, dimethylglycine, 3-amino-3-methylamine, and the like. These basic compounds may be used either singly or in combination. In a particular embodiment, the basic compound may be selected from the group consisting of sodium carbonate, sodium hydroxide, potassium hydroxide and a combination thereof.

The base may be present in the aqueous injection fluid in an amount of at least about 0.05 wt %, at least about 0.1 wt %, at least about 0.25 wt %, at least about 0.5 wt % or about 1.0 wt %. In particular, the base may be present in the aqueous injection fluid in an amount of at least about 0.1 wt %. Additionally or alternatively, the base may be present in the aqueous injection fluid in an amount of about 0.05 wt % to about 1.0 wt %, about 0.05 wt % to about 0.5 wt % or about 0.05 wt % to about 0.25 wt %.

II.D. Amphiphilic Diblock Copolymer

As discussed above, an amphiphilic diblock copolymer may be present in the aqueous injection fluid instead of or in addition to the crude oil emulsion and the basic compound. Thus, another embodiment directed toward an aqueous injection fluid is provided, wherein the aqueous injection fluid comprises: a polymer comprising hydrophilic moieties as described herein and a plurality of hydrophobic groups as described herein; and an amphiphilic diblock copolymer. Without being bound by theory, is it is believed that similar to the interactions between the polymer and the crude oil emulsions, the combination of the polymer and the amphiphilic diblock copolymer can achieve increased viscosity of the aqueous injection fluid due to the physical hydrophobic bonds between the hydrophobic groups on the polymer and amphiphilic diblock copolymer. Suitable amphiphilic diblock copolymers include, but are not limited to, polyethylene-block-polyethylene glycol, polyethylene-block-polypropylene glycol, polyethylene glycol-block-polystyrene, polyethylene oxide-block-polycaprolactone, and combinations thereof.

The amphiphilic diblock copolymer may have a molecular weight of at least about 100 g/mol, at least about 500 g/mol, at least about 1,000 g/mol, at least about 2,500 g/mol, at least about 5,000 g/mol, at least about 7,500 g/mol, at least about 10,000 g/mol, at least about 25,000 g/mol, or about 50,000 g/mol. Additionally or alternatively, the amphiphilic diblock copolymer may have a molecular weight of about 100 g/mol to about 50,000 g/mol, about 100 to about 25,000 g/mol, about 100 g/mol to about 10,000 g/mol, about 500 g/mol to about 50,000 g/mol, about 500 g/mol to about 25,000 g/mol, about 500 g/mol to about 100,000 g/mol, or about 500 g/mol to about 7,500 g/mol. In particular, the amphiphilic diblock polymer may have a molecular weight of about 500 g/mol to about 25,000 g/mol, about 500 g/mol to about 10,000 g/mol or about 1,000 g/mol to about 5,000 g/mol.

The amphiphilic diblock copolymer may be present, in combination with the polymer and/or crude oil, in an amount of at least about 0.02 wt %, at least about 0.05 wt %, at least about 0.07 wt %, at least about 0.10 wt %, at least about 0.20 wt %, at least about 0.30 wt %, at least about 0.40 wt %, at least about 0.50 wt %, at least about 0.60 wt %, at least about 0.70 wt %, at least about 0.80 wt %, at least about 0.90 wt %, at least about 1.0 wt %, at least about 2.0 wt %, at least about 3.0 wt %, at least about 4.0 wt %, or about 5.0 wt %. Additionally or alternatively, the amphiphilic diblock copolymer may be present, in combination with the polymer and/or crude oil, in an amount of about 0.02 wt % to about 5.0 wt %, about 0.02 wt % to about 3.0 wt %, about 0.02 wt % to about 1.0 wt %, about 0.02 wt % to about 0.50 wt %, 0.05 wt % to about 5.0 wt %, about 0.05 wt % to about 3.0 wt %, about 0.05 wt % to about 1.0 wt %, about 0.05 wt % to about 0.90 wt %, about 0.05 wt % to about 0.80 wt %, about 0.05 wt % to about 0.70 wt %, about 0.05 wt % to about 0.60 wt %, about 0.05 wt % to about 0.50 wt %, about 0.05 wt % to about 0.40 wt %, about 0.05 wt % to about 0.30 wt %, about 0.05 wt % to about 0.20 wt %, or about 0.05 wt % to about 0.10 wt %. In particular, the amphiphilic diblock copolymer, in combination with the polymer and/or crude oil, may be present in an amount of about 0.02 wt % to about 3.0 wt %, about 0.05 wt % to about 2.0 wt %, about 0.05 wt % to about 1.0 wt % or about 0.07 wt % to about 0.80 wt %. In one embodiment, the polymer may be present in an amount of about 0.05 wt % to about 1.0 wt % and the amphiphilic diblock copolymer may be present in an amount about 0.05 wt % to about 1.0 wt %.

In certain variations, no further surfactant agents as described herein may be present in the aqueous injection fluid besides the amphiphilic diblock copolymer. Alternatively, such further agents may be present in addition to the amphiphilic diblock copolymer.

In another embodiment, an aqueous injection fluid is provided, wherein the aqueous injection fluid comprises: a polymer comprising hydrophilic moieties as described herein and a plurality of hydrophobic groups as described herein; an aqueous crude oil emulsion as described herein; a basic compound as described herein; and an amphiphilic diblock copolymer as described herein. The aqueous injection fluid may comprise polymer, the crude oil, and the amphiphilic diblock copolymer in the amounts described herein. In particular, the aqueous injection fluid may comprise polymer in amount of about 0.05 wt % to about 1.0 wt %, the crude oil in an amount of about 0.10 wt % to about 1.0 wt %, and the amphiphilic diblock copolymer in an amount of about 0.05 wt % to about 1.0 wt %

Such an aqueous injection fluid is particularly advantageous when the oil reservoir has a high salinity concentration (e.g., at least about 5000 ppm). Under such high salinity conditions, phase separation of the oil in the crude oil emulsion may occur and such phase separation may be undersirable depending upon the type of polymer comprising hydrophilic moieties and a plurality of hydrophobic groups used. Without being bound by theory, it is believed that the presence of the amphiphilic diblock copolymer can stabilize the crude oil emulsion in high salinity environments and prevent undesirable phase separation of the oil, which, in some instances, can lead to lower viscosification of the injection fluid. For example, a hydrophobic portion of the diblock copolymer can penetrate into the oil droplet while a hydrophilic portion of the diblock copolymer can remain in the aqueous phase and the oil droplets may be prevented from coalescing.

In certain variations, no further surfactant agents as described herein may be present in the aqueous injection fluid besides the amphiphilic diblock copolymer and/or the aqueous crude oil emulsions. Alternatively, such further agents may be present in addition to the amphiphilic diblock copolymer and/or the aqueous crude oil emulsions.

II.E. Viscosity and Shear Degradation

As discussed above, the aqueous injection fluids described herein have increased viscosity rendering them especially well-suited for enhanced oil recovery. For example, the aqueous injection fluids described herein may have a greater viscosity compared to a viscosity of an aqueous fluid comprising the polymer described herein without the crude oil emulsion and/or the amphiphilic diblock copolymer. In various aspects, the aqueous injection fluids described herein may have a viscosity at least about 2 times greater, at least about 3 times greater, at least about 4 times greater, at least about 5 times greater, at least about 6 times greater, at least about 7 times greater, at least about 8 times greater, at least about 9 times greater or about 10 times greater compared to a viscosity of an aqueous injection fluid comprising the polymer described herein without the crude oil emulsion and/or the amphiphilic diblock copolymer.

In particular, the aqueous injection fluids described herein may have a viscosity of at least about 5 cps, at least about 10 cps, at least about 50 cps, at least about 100 cps, at least about 200 cps, at least about 300 cps, at least about 400 cps, at least about 500 cps, at least about 600 cps, at least about 700 cps, at least about 800 cps, at least about 900 cps, at least about 1000 cps, at least about 1200 cps, or about 1500 cps. Additionally or alternatively, the aqueous injection fluids described herein may have a viscosity of about 5 cps to about 1500 cps, about 5 cps to about 1200 cps, about 5 cps to about 1000 cps, about 10 cps to about 1500 cps, about 10 cps to about 1200 cps, about 10 cps to about 1000 cps, about 100 to about 1500 cps, about 100 to about 1200 cps, about 100 to about 1000 cps, about 500 to about 1500 cps, about 500 to about 1200 cps or about 500 to about 1000 cps. In particular, the aqueous injection fluids described herein may have a viscosity of about 10 cps to about 1500 cps, about 10 cps to about 1200 cps, about 10 cps to about 1000 cps, about 100 to about 1200 cps, about 100 to about 1000 cps, about 500 to about 1200 cps or about 500 to about 1000 cps. Unless otherwise indicated, the viscosities measurements discussed herein were performed with an Anton Paar MCR 302 stress controlled rheometer with a double wall Couette fixture at a temperature of about 25° C.

Additionally or alternatively, the aqueous injection fluids described herein advantageously may have substantially no shear degradation at a shear rate of at least about 10 s$^{-1}$, at least about 100 s$^{-1}$, at least about 200 s$^{-1}$, at least about 300 s$^{-1}$, at least about 400 s$^{-1}$, at least about 500 s$^{-1}$, at least about 600 s$^{-1}$, at least about 700 s$^{-1}$, at least about 800 s$^{-1}$, at least about 900 s$^{-1}$, or up to about 1000 s$^{-1}$. As used herein, "shear degradation" refers to permanent degradation or breaking of the polymer chain in the aqueous injection fluid. In particular, the aqueous injection fluids described herein advantageously may have substantially no shear degradation at a shear rate up to about 1000 s$^{-1}$.

III. METHODS OF PREPARING AQUEOUS INJECTION FLUIDS

In additional embodiments, methods of preparing the aqueous injection fluids are provided. The method may comprise mixing crude oil as described herein with a basic aqueous solution to form a crude oil emulsion as described herein. The mixture of crude oil and the basic aqueous solution may be agitated for a suitable amount of time to form the crude oil emulsion. Additionally, the crude oil emulsion may be allowed to equilibrate to separate any excess oil prior to addition of the polymer as described herein. For example, the crude oil emulsion may be placed into a separatory funnel or other suitable device and allowed to equilibrate for at least about 3 days, at least about 7 days, at least about 10 days, at least about 14 days, at least about 18 days, at least about 21 days, or at least about 24 days.

In some variations, salt may be added to the crude oil emulsion to cause larger oil droplets to separate out and leave behind a crude oil microemulsion.

A polymer comprising hydrophilic moieties as described herein and a plurality of hydrophobic groups as described herein may be added to the crude oil emulsion (e.g., microemulsion and/or macroemulsion) to form the aqueous injection fluid as described herein. The basic aqueous solution may comprise a basic compound as described herein, for example, alkali metal hydroxides, carbonates, bicarbonates, ammonium salts and amines, particularly, sodium carbonate, sodium hydroxide, potassium hydroxide and combinations thereof.

Additionally or alternatively, an amphiphilic diblock copolymer as described herein may be added to the crude oil emulsion prior to addition of the polymer comprising hydrophilic moieties as described herein and a plurality of hydrophobic groups as described herein. Alternatively, the amphiphilic diblock copolymer as described herein may be added with the polymer comprising hydrophilic moieties as described herein and a plurality of hydrophobic groups as described herein in the absence of the crude oil emulsion.

IV. METHODS FOR RECOVERING OIL

As discussed above, the aqueous injection fluids described herein have increased viscosity along with shear stability making them particularly well-suited for oil recovery. Thus, methods of recovering oil from an oil reservoir using the aqueous injection fluids described herein are provided.

In one embodiment, the method comprises introducing an aqueous injection fluid into the oil reservoir to force the oil into a producing well for recovery. The aqueous injection fluid comprises: a polymer comprising hydrophilic moieties as described herein and a plurality of hydrophobic groups as described herein; and at least one of: an aqueous crude oil emulsion as described herein and a basic compound as described herein, wherein the crude oil has a TAN greater than about 0.4 as measured according to ASTM D664; and/or an amphiphilic diblock copolymer as described herein.

In another embodiment, in instances where the oil reservoir may have a high salinity concentration, the method comprises introducing an aqueous injection fluid into the oil reservoir having a higher salinity concentration to force the oil into a producing well for recovery. The aqueous injection fluid comprises: a polymer comprising hydrophilic moieties as described herein and a plurality of hydrophobic groups as described herein; an aqueous crude oil emulsion as described herein, wherein the crude oil has a total acid number (TAN) greater than about 0.4 as measured according to ASTM D664; a basic compound as described herein; and an amphiphilic diblock copolymer as described herein.

In such instances, the oil reservoir may have a salinity concentration by weight of at least about 3,000 ppm, at least about 5,000 ppm, at least about 10,000 ppm, at least about 25,000 ppm, at least about 50,000 ppm, at least about 75,000 ppm, at least about 100,000 ppm, at least about 125,000 ppm, at least about 150,000 ppm, at least about 175,000 ppm or up to about 200,000 ppm. In particular, the oil reservoir may have a salinity concentration of at least about 5,000 ppm, or up to about 2000,000 ppm. Additionally or alternatively, the oil reservoir may have a salinity concentration of about 3,000 ppm to about 200,000 ppm, about 3,000 ppm to about 150,000 ppm, about 3,000 ppm to about 125,000 ppm, about 3,000 ppm to about 100,000 ppm, about 3,000 ppm to about 75,000 ppm, about 3,000 ppm to about 50,000 ppm, about 3,000 ppm to about 25,000 ppm, about 3,000 ppm to about 10,000 ppm, about 5,000 ppm to about 200,000 ppm, about 5,000 ppm to about 150,000 ppm, about 5,000 ppm to about 125,000 ppm, about 5,000 ppm to about 100,000 ppm, about 5,000 ppm to about 75,000 ppm, about 5,000 ppm to about 50,000 ppm, about 5,000 ppm to about 25,000 ppm, about 5,000 ppm to about 10,000 ppm, about 25,000 ppm to about 200,000 ppm, about 25,000 ppm to about 150,000 ppm, about 25,000 ppm to about 125,000 ppm, about 25,000 ppm to about 100,000 ppm, about 25,000 ppm to about 75,000 ppm, about 25,000 ppm to about 50,000 ppm, about 50,000 ppm to about 200,000 ppm, about 50,000 ppm to about 150,000 ppm, about 50,000 ppm to about 125,000 ppm, about 5,0000 ppm to about 100,000 ppm, or about 50,000 ppm to about 75,000 ppm.

In the oil recovering methods described herein, the aqueous injection fluids described herein may be introduced into the oil reservoir under suitable conditions. For example, the injection fluids described herein may be introduced under a pressure of about 100 psi to about 6000 psi and a temperature of about 60° F. to about 150° F.

Advantageously, the aqueous injection fluid may be introduced as a single injection fluid in the above-described methods. That is, no further fluids may be necessary following introduction of the aqueous injection fluid, for example, there may be no need for a further brine or post-polymer flush fluid.

V. METHODS FOR INCREASING VISCOSITY OF AN INJECTION FLUID

In additional embodiments, methods for increasing viscosity of an aqueous injection fluid are provided. The method comprises: mixing crude oil as described herein with a basic aqueous solution as described herein to form a crude oil emulsion as described herein. A polymer comprising hydrophilic moieties as described herein and a plurality of hydrophobic groups as described herein may be added to the crude oil emulsion to form the aqueous injection fluid having a viscosity of about 10 cps to about 1,000 cps. Additionally or alternatively, the aqueous injection fluids may have a viscosity of about 10 cps to about 1500 cps, about 10 cps to about 1200 cps, about 10 cps to about 1000 cps, about 100 to about 1500 cps, about 100 to about 1200 cps, about 100 to about 1000 cps, about 500 to about 1500 cps, about 500 to about 1200 cps or about 500 to about 1000 cps. In particular, the aqueous injection fluids may have a viscosity of about 10 cps to about 1500 cps, about 10 cps to about 1200 cps, about 10 cps to about 1000 cps, about 100 to about 1200 cps, about 100 to about 1000 cps, about 500 to about 1200 cps or about 500 to about 1000 cps.

Advantageously, the aqueous injection fluid has a greater viscosity compared to a viscosity of an aqueous fluid comprising the polymer without the crude oil emulsion. For example, the aqueous injection fluid may have a viscosity at least about 2 times greater, at least about 3 times greater, at least about 4 times greater, at least about 5 times greater, at least about 6 times greater, at least about 7 times greater, at least about 8 times greater, at least about 9 times greater or about 10 times greater compared to a viscosity of an aqueous fluid comprising the polymer described herein without the crude oil emulsion.

Additionally or alternatively, the aqueous injection fluids advantageously may have substantially no shear degradation at a shear rate of at least about 10 $s^{-1}$, at least about 100 $s^{-1}$, at least about 200 $s^{-1}$, at least about 300 $s^{-1}$, at least about 400 $s^{-1}$, at least about 500 $s^{-1}$, at least about 600 $s^{-1}$, at least about 700 $s^{-1}$, at least about 800 $s^{-1}$, at least about 900 $s^{-1}$, or up to about 1000 $s^{-1}$. As used herein, "shear degradation" refers to permanent degradation or breaking or scission of the polymer chain in the aqueous injection fluid. In particular, the aqueous injection fluids described herein advantageously may have substantially no shear degradation at a shear rate up to about 1000 $s^{-1}$.

VI. FURTHER EMBODIMENTS

The invention can additionally or alternatively include one or more of the following embodiments.

Embodiment 1

An aqueous injection fluid comprising: a polymer comprising hydrophilic moieties and a plurality of hydrophobic groups; an aqueous crude oil emulsion, wherein the crude oil has a total acid number (TAN) greater than about 0.4 or at least about 1.5 as measured according to ASTM D664; and a basic compound (e.g., alkali metal hydroxides, carbonates, bicarbonates, ammonium salts, and amines, such as sodium carbonate, sodium hydroxide, and potassium hydroxide).

Embodiment 2

The aqueous injection fluid of embodiment 1, wherein the crude oil emulsion comprises crude oil droplets having an average diameter of about 10 nm to about 100 µm.

Embodiment 3

An aqueous injection fluid comprising: a polymer comprising hydrophilic moieties and a plurality of hydrophobic groups; and an amphiphilic diblock copolymer (e.g., polyethylene-block-polyethylene glycol, polyethylene-block-polypropylene glycol, polyethylene glycol-block-polystyrene, polyethylene oxide-block-polycaprolactone, and a combination thereof).

Embodiment 4

The aqueous injection fluid of any one of the previous embodiments, wherein the polymer has a molecular weight of about 10,000 g/mol to about 2,000,000 g/mol, particularly about 10,000 g/mol to about 1,000,000 g/mol.

Embodiment 5

The aqueous injection fluid of any one of the previous embodiments, wherein the hydrophobic groups are selected from the group consisting of a $C_8$-$C_{18}$ alkyl, an aralkyl, an alkylphenol, a haloalkyl, a quaternary ammonium halide and a combination thereof.

Embodiment 6

The aqueous injection fluid of any one of the previous embodiments, wherein the hydrophilic moieties are selected from the group consisting of an ethylenically unsaturated amide, an N-substituted derivative of the ethylenically unsaturated amide, an ethylenically unsaturated carboxylic acid, a sulfoalkyl ester of an unsaturated carboxylic acid, an aminoalkyl ester of an unsaturated carboxylic acids, a diallyl ammonium compound, a vinyl heterocyclic amide, a vinylaryl sulfonate, hydrolyzed acrylamide, non-hydrolyzed acrylamide, ethylene oxide, a monosaccharide, a urethane, and a combination thereof.

Embodiment 7

The aqueous injection fluid of any one of the previous embodiments, wherein the polymer is present in an amount of about 0.05 wt % to about 1.0 wt % and at least one of: the crude oil is present in an amount of about 0.10 wt % to about 1.0 wt % or the amphiphilic diblock copolymer is present in an amount of about 0.05 wt % to about 1.0 wt %.

Embodiment 8

The aqueous injection fluid of any one of the previous embodiments having a viscosity of about 10 cps to about 1,000 cps and/or having substantially no shear degradation at a shear rate of up to about 1000 $s^{-1}$.

Embodiment 9

The aqueous injection fluid of any one of the previous embodiments, having a greater viscosity compared to a viscosity of an aqueous fluid comprising the polymer without the crude oil emulsion or the amphiphilic diblock copolymer.

Embodiment 10

The aqueous injection fluid of any one of the previous embodiments, wherein no further surfactant agent is present besides the aqueous crude oil emulsion or the amphiphilic diblock copolymer.

Embodiment 11

A method of preparing an aqueous injection fluid composition, wherein the method comprises: mixing crude oil, optionally having a total acid number (TAN) greater than about 0.4 or at least about 1.5 as measured according to ASTM D664, with a basic aqueous solution (e.g., comprising a basic compound selected from the group consisting of sodium carbonate, sodium hydroxide, and potassium hydroxide) to form a crude oil emulsion, optionally allowing the crude oil emulsion to equilibrate for at least about 7 days; and adding a polymer comprising hydrophilic moieties and a plurality of hydrophobic groups to the crude oil emulsion to form the aqueous injection fluid.

Embodiment 12

A method for increasing viscosity of an aqueous injection fluid, wherein the method comprises: mixing crude oil, optionally having a total acid number (TAN) greater than about 0.4 or at least about 1.5 as measured according to ASTM D664, with a basic aqueous solution (e.g., comprising a basic compound selected from the group consisting of alkali metal hydroxides, carbonates, bicarbonates, ammonium salts, and amines, such as sodium carbonate, sodium hydroxide, and potassium hydroxide) to form a crude oil emulsion; and adding a polymer comprising hydrophilic moieties and a plurality of hydrophobic groups to the crude oil emulsion to form the aqueous injection fluid having a viscosity of about 10 cps to about 1,000 cps.

Embodiment 13

A method for recovering oil from an oil reservoir, wherein the method comprises: introducing an aqueous injection fluid (e.g., as a single injection fluid) into the oil reservoir to force the oil into a producing well for recovery, wherein the aqueous injection fluid comprises: a polymer comprising hydrophilic moieties and a plurality of hydrophobic groups; and at least one of: (i) an aqueous crude oil emulsion and a basic compound (e.g., alkali metal hydroxides, carbonates, bicarbonates, ammonium salts, and amines, such as sodium carbonate, sodium hydroxide, and potassium hydroxide), wherein the crude oil has a TAN greater than about 0.4 or at least about 1.5 as measured according to ASTM D664; or (ii) an amphiphilic diblock copolymer (e.g., polyethylene-block-polyethylene glycol, polyethylene-block-polypropylene glycol, polyethylene glycol-block-polystyrene, polyethylene oxide-block-polycaprolactone, and a combination thereof).

Embodiment 14

The method of embodiment 13, wherein the aqueous injection fluid is introduced into the oil reservoir under a pressure of about 100 psi to about 6000 psi.

Embodiment 15

The method of any one of embodiments 12-14, wherein the crude oil emulsion comprises crude oil droplets having an average diameter of about 10 nm to about 100 μm.

Embodiment 16

The method of any one of embodiments 12-15, wherein the polymer has a molecular weight of about 10,000 g/mol to about 2,000,000 g/mol, particularly about 10,000 g/mol to about 1,000,000 g/mol.

Embodiment 17

The method of any one of embodiments 12-16, wherein the hydrophobic groups are selected from the group consisting of a $C_8$-$C_{18}$ alkyl, an aryl, an aralkyl, an alkylphenol, a haloalkyl, a quaternary ammonium halide and a combination thereof.

Embodiment 18

The method of any one of embodiments 12-17, wherein the hydrophilic moieties are selected from the group consisting of an ethylenically unsaturated amide, an N-substituted derivative of the ethylenically unsaturated amide, an ethylenically unsaturated carboxylic acid, a sulfoalkyl ester of an unsaturated carboxylic acid, an aminoalkyl ester of an unsaturated carboxylic acids, a diallyl ammonium compound, a vinyl heterocyclic amide, a vinylaryl sulfonate, hydrolyzed acrylamide, non-hydrolyzed acrylamide, ethylene oxide, a monosaccharide, a urethane, and a combination thereof.

Embodiment 19

The method of any one of embodiments 12-18, wherein the aqueous injection fluid comprises polymer in an amount of about 0.05 wt % to about 1.0 wt % and at least one of: the crude oil is present in an amount of about 0.10 wt % to about 1.0 wt % or the amphiphilic diblock copolymer is present in an amount of about 0.05 wt % to about 1.0 wt %.

Embodiment 20

The method of any one of embodiments 12-19, wherein the aqueous injection fluid has a viscosity of about 10 cps to about 1,000 cps and/or substantially no shear degradation at a shear rate of up to about 1000 $s^{-1}$.

Embodiment 21

The method of any one of embodiments 12-20, wherein the aqueous injection fluid has a greater (e.g., at least about 7 times greater) viscosity compared to a viscosity of an aqueous fluid comprising the polymer without the crude oil emulsion.

Embodiment 22

The method of any one of embodiments 12-21, wherein no further surfactant agent is present besides the aqueous crude oil emulsion and/or the amphiphilic diblock copolymer.

EXAMPLES

Example 1—Preparation of Aqueous Crude Oil Emulsion

Crude oil (500 ml) with a total acid number (TAN) of about 4.0 (obtained from Doba field in Chad), as measured according to ASTM D664, was mixed into a 500 ml solution of 0.1% $Na_2CO_3$ in water using a blender to produce an aqueous crude oil emulsion. The crude oil emulsion was poured into a separatory funnel and allowed to equilibrate for 2-3 weeks to separate excess oil. The aqueous crude oil emulsion included a lower aqueous phase having an oil-in-water macroemulsion with a small fraction of excess microemulsion droplets. The lower phase was stable per visual inspection, exhibited stability for about 1.5 years. There was no visual coalescence of larger oil droplets, and distinct oil and aqueous phases were not visible. FIG. 1 provides a schematic of the preparation of the aqueous crude oil emulsion.

Example 2—Injection Fluid Compositions with PU1191 and an Aqueous Crude Oil Emulsion

Example 2a: Preparation of Sample 1—Injection Fluid Composition Comprising PU1191 and an Aqueous Crude Oil Emulsion A 5 wt % solution of polyurethane polymer, Rheovis® PU 1191 (obtained from BASF) having a plurality of hydrophobic groups was added to the aqueous crude oil emulsion containing about 0.10 wt % oil of Example 1 and mixed to produce Sample 1.

Example 2b: Preparation of Comparative Sample 1—Injection Fluid Comprising PU1191

A 5 wt % solution of polyurethane polymer, Rheovis® PU 1191 (obtained from BASF) having a plurality of hydrophobic groups was added to 0.1% $Na_2CO_3$ in water and mixed to make Comparative Sample 1.

Example 2c: Preparation of Sample 2—Injection Fluid Composition Comprising PU1191 and an Aqueous Crude Oil Emulsion Subjected to Centrifugation Following preparation of the aqueous crude oil emulsion according to Example 1, the aqueous crude oil emulsion was centrifuged at 20,000 g for 2 hours. This centrifuging process separated out larger oil droplets from the microemulsion and the resulting subnatant looked optically clearer than the emulsion as originally prepared. Sample 2 was prepared by mixing the subnatant and 1 wt % Rheovis® PU 1191 (obtained from BASF).

Example 2d: Preparation of Sample 20—Injection Fluid Composition Comprising Cellulosic Polymer A 0.5 wt % solution of cellulosic polymer, hydrophobically modified hydroxyethyl cellulose (obtained from Natrosol) having a plurality of hydrophobic groups was added to deionized water and mixed to make Sample 20.

Example 2e: Viscosity Studies

Figure 2:
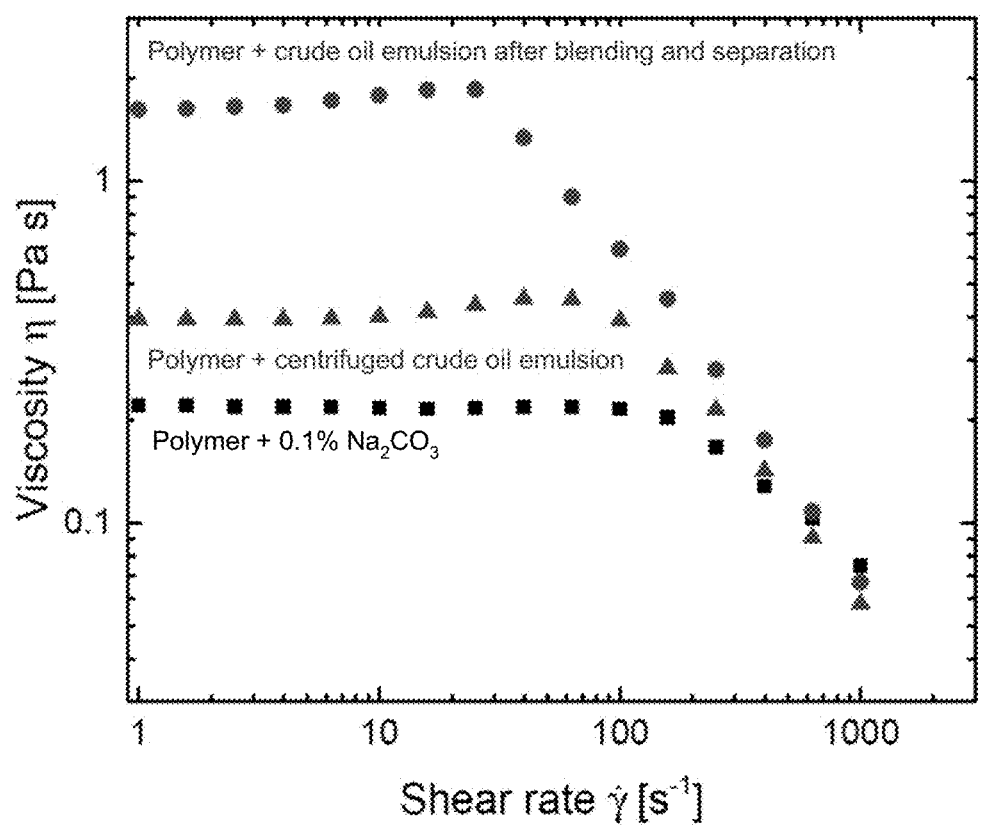
FIG. 2 illustrates viscosity vs. shear rate curves for Sample 1, Comparative Sample 1 and Sample 2.

Viscosity was measured at increasing shear rates for Sample 1 (circles), Comparative Sample 1 (squares), and Sample 2 (triangles), as provided in FIG. 2. Viscosity measurements were made using an Anton Paar MCR 502 stress controlled rheometer at 25° C. As shown in FIG. 2, for Comparative Sample 1, the zero shear viscosity is about 200 cP. At higher shear rates, the polymer in Comparative Sample 1 shows shear thinning behavior. It is understood in the art that the viscosity increase from including polymers with hydrophobic groups originates form a bridged-network-like structure formed by aggregates of the hydrophobic groups. The hydrophobic groups prefer an apolar environment and hence form flower-like micellar structures. A fraction of the polymers bridge across these micellar structures and form a network in solution.

Advantageously, the zero shear viscosity of Sample 1 is a factor of 7 times higher than Comparative Sample 1. The large increase in viscosity compared to Comparative Sample 1 (without the crude oil emulsion) originates from synergistic interactions between the oil droplets in the emulsion and the hydrophobically groups on the polymer. The zero shear viscosity of Sample 2 is a factor of 2 higher than Comparative Sample 1. This indicates that the excess oil present in the crude oil emulsion of Example 1 exhibits synergism with the hydrophobic groups on the polymers, and the amount of oil droplets in the crude oil emulsion can be tuned to increase viscosity.

Figure 3:
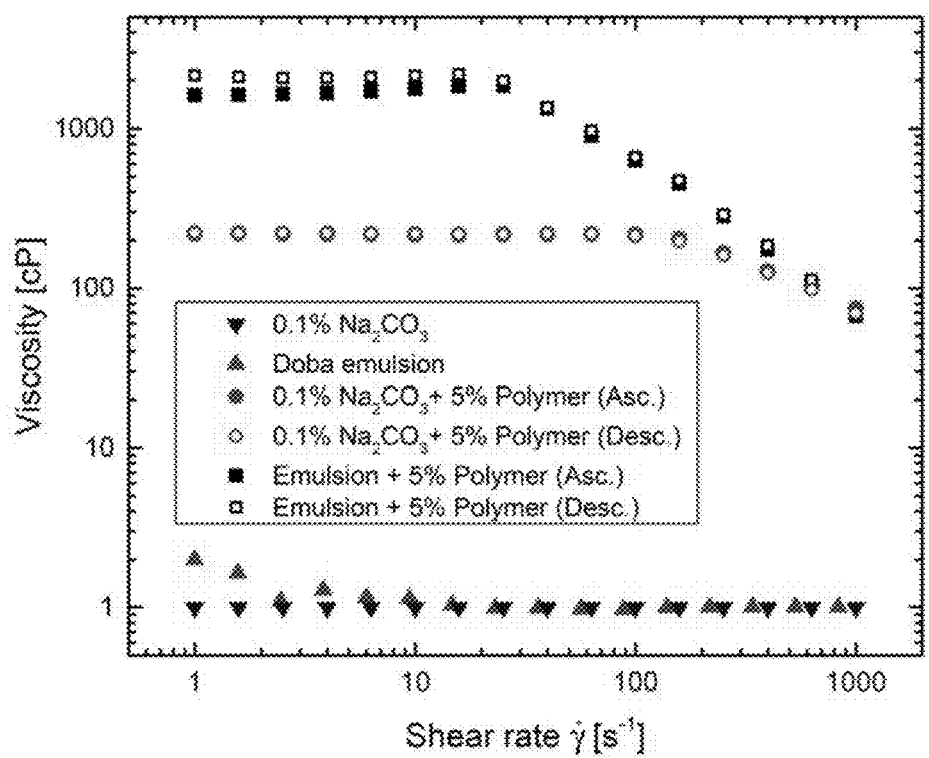
FIG. 3 illustrates viscosity vs. shear rate curves for Sample 1, Comparative Sample 1, Sample 3 and Sample 4.

Additionally, the viscosity vs. shear rate curves presented in FIG. 2 were shear reversible as discussed below and shown in FIG. 3. Increasing and then decreasing the shear rate on the same sample generates identical viscosities and there is no shear degradation of Sample 1 up to shear rates of 1000 s$^{-1}$. FIG. 3 shows viscosity as a function of shear rate for Sample 1 (squares), Comparative Sample 1 (circles), 0.1% $Na_2CO_3$ in water (Sample 3) (down-pointing triangles), and the crude oil emulsion prepared according to Example 1 (Sample 4) (up-pointing triangles). Viscosity measurements were performed with an Anton Paar MCR 302 stress controlled rheometer with a double wall Couette fixture. Experiments were performed at 25° C.

The filled and hollow symbols refer to experiments where the shear rate was changed in ascending or descending manners respectively. The descending rate experiment was performed immediately after the ascending run, on the same sample. For Sample 1, the ascending and descending runs nearly overlap suggesting no observable shear degradation, at least until about 1000 s$^{-1}$. In fact, for Sample 1, the viscosity of the descending run was slightly higher. If there was shear degradation, the descending run would lie below the ascending run. Shear degradation is understood as a permanent change in the molecular structure of the polymer, usually chain scission due to high shear, which leads to a permanent lowering of viscosity. On the other hand, shear thinning is caused by a reversible flow induced structural change in the polymer coils. Under high shear, the polymer chains are elongated and align with the flow direction, which causes them to run into each other less and entangle less when compared to low shear rates, and hence showing the decreased viscosity. At a sufficiently high shear rate, most polymers will begin to shear degrade. The critical shear rate value at which polymer degradation begins depends on the chemistry of the polymer.

Example 3—Injection Fluid Compositions with Hydrophobically Modified Hydroxyethyl Cellulose (HMHEC) and an Aqueous Crude Oil Emulsion Example 3a: Preparation of Samples 5-9—Injection Fluid Composition Comprising HMHEC and an Aqueous Crude Oil Emulsion 3 wt % NaCl was added to an aqueous crude oil emulsion prepared according to Example 1 containing about 0.10 wt % oil, which caused larger oil droplets to phase separate out of solution leaving a microemulsion (transparent solution with a light yellow color). HMHEC (Natrosol 330 plus CS, obtained from Ashland, Inc.) was added to varying concentrations of the microemulsion to obtain Samples 5-9, as shown in Table 1.

TABLE 1

| Sample | Microemulsion Concentration (Relative Volume Fraction) |
| --- | --- |
| 5 | 0.025 |
| 6 | 0.06 |
| 7 | 0.1 |
| 8 | 0.25 |
| 9 | 0.7 |

Example 3b: Viscosity Studies

Figure 4:
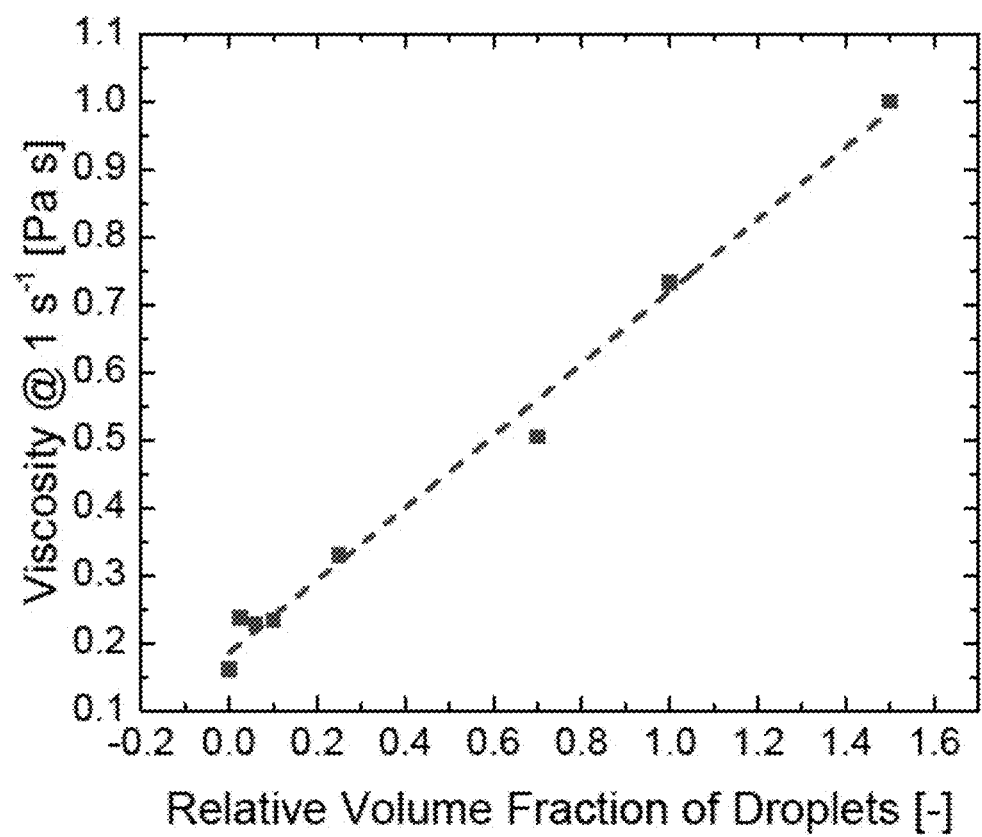
FIG. 4 illustrates viscosity vs. relative volume fraction of oil droplets for Samples 5-9.

Viscosity was measured for Samples 5-9. Viscosity measurements were performed with an Anton Paar MCR 302 stress controlled rheometer with a double wall Couette fixture. Experiments were performed at 25° C. As shown in FIG. 4, increasing concentration of the microemulsion (i.e. increasing the relative volume fraction of oil droplets), viscosity increases by nearly an order of magnitude from Sample 5 to Sample 9.

Figure 5:
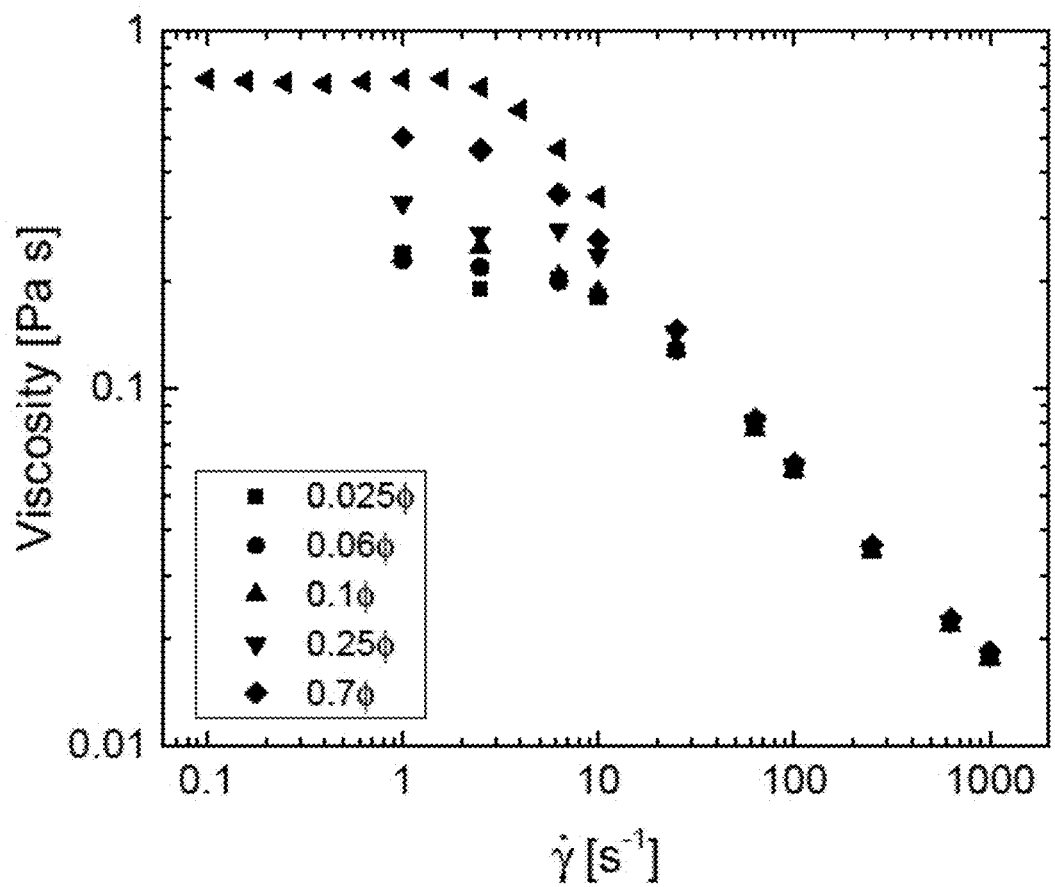
FIG. 5 illustrates viscosity vs. shear rate curves for Samples 5-9.

Viscosity was also measured at increasing shear rates for Sample 5 (squares), Comparative Sample 6 (circles), Sample 7 (up-pointing triangles), Sample 8 (down-pointing triangles), and Sample 9 (diamond), as shown in FIG. 5. FIG. 5 indicates that Samples 5-9 experience shear thinning, i.e., viscosity decreases with increasing applied shear rate. Such a shear thinning feature is desirable in an injection fluid because the lower viscosity at higher shear rates makes it easier to pump. Further, shear thinning at these shear rates is reversible for these samples. At the lower shear rates found in the reservoir the viscosity goes back up to the desired viscosity.

Example 4—Injection Fluid Compositions with PU1191 and an Amphiphilic Diblock Copolymer Example 4a: Preparation of Samples 10-12—Injection Fluid Compositions Comprising PU1191 and an Amphiphilic Diblock Copolymer Injection fluid compositions (Samples 10-12) were prepared by mixing a 5 wt % solution of polyurethane polymer, Rheovis® PU 1191 (obtained from BASF) having a plurality of hydrophobic groups with varying concentrations of an amphiphilic diblock copolymer as shown in Table 2 below. The amphiphilic diblock copolymer used was polyethylene-polyethylene glycol diblock copolymer (PE-PEG) with a molecular weight of 2250 g/mol and approximately 80% of the mass of the polymer consists of the hydrophilic polyethylene oxide chain. The amphiphilic diblock polymer was obtained from Sigma Aldrich.

TABLE 2

| Sample | wt % PU 1191 | wt % PE-PEG |
| --- | --- | --- |
| 10 | 1.0 | 0.50 |
| 11 | 1.0 | 2.5 |
| 12 | 1.0 | 5.0 |

The structure of PE-PEG is shown below:

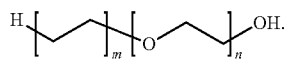

Example 4b: Preparation of Comparative Sample 2—Injection Fluid Compositions Comprising PU1191 and De-Ionized Water Comparative Sample 2 was prepared by were prepared by mixing 5 g of Rheovis® PU 1191 (obtained from BASF) having a plurality of hydrophobic groups with 95 g of de-ionized (DI) water to form a 5 wt % solution of polyurethane polymer, Rheovis® PU 1191 in DI water.

Example 4c: Viscosity Studies

Figure 6:
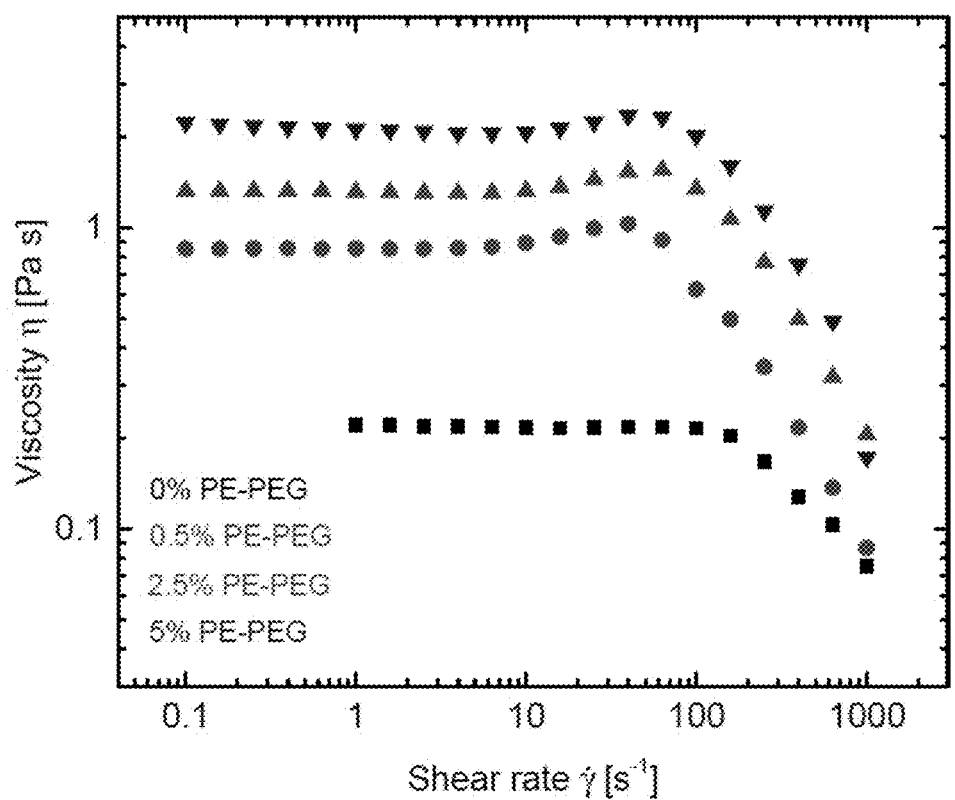
FIG. 6 illustrates viscosity vs. shear rate curves for Comparative Sample 1 and Samples 10-12.

Viscosity was measured at increasing shear rates for Comparative Sample 2 (squares), Sample 10 (circles), Sample 11 (up-pointing triangles), and Sample 12 (down-pointing triangles), as shown in FIG. 6. Viscosity measurements were performed with an Anton Paar MCR 302 stress controlled rheometer with a double wall Couette fixture. Experiments were performed at 25° C. As shown in FIG. 6, the viscosity of Sample 12 was an order of magnitude higher than the viscosity in the absence of the amphiphilic diblock copolymer (Comparative Sample 1).

Example 5—Salinity Tolerance

Example 5a: Preparation of Samples 13-18: Compositions with Amphiphilic Diblock Copolymer and Crude Oil Emulsion with NaCl High salinity oil reservoirs typically contain total dissolved solids/salts (e.g., NaCl, $CaCl_2$, $MgCl_2$) in the range of 100,000 ppm to 150,000 ppm. This amount of salt may cause oil to separate out of crude oil emulsions. When 3-4 wt % NaCl is added to a crude oil emulsion as prepared in Example 1, the excess oil phase separated out of solution. The resulting lower phase was a clear solution with a light-yellow appearance. The phase separation may be caused by the screening of stabilizing electrostatic repulsions between oil droplets. The loss of the oil droplets can cause a reduction in viscosity of some of the injection fluid compositions comprising certain polymers comprising hydrophilic moieties and a plurality of hydrophobic groups. Therefore, depending on the chemistry of the polymer comprising hydrophilic moieties and a plurality of hydrophobic groups, modifications to the injection fluid composition may be necessary so that the crude oil emulsion remains stable in high salinity environments. To enhance salinity tolerance, an amphiphilic diblock copolymer was added. The amphiphilic diblock copolymer used was polyethylene-polyethylene glycol diblock copolymer (PE-PEG).

Without being bound by theory, the amphiphilic diblock copolymer may adsorb at the oil-droplet aqueous interface. For example, the hydrophobic polyethylene oxide end of the chain remains in the aqueous phase. The PEG block of the copolymer is rather bulky at 1 k molecular weight (approximately 1.2 nm coil size) and the mutual steric repulsion can prevent the oil droplets coalescing. When the amphiphilic diblock copolymer is added in to the crude oil emulsion, the resulting mixture is stable against phase separation up to salt concentrations close to the solubility limit of NaCl in water.

Figure 7:
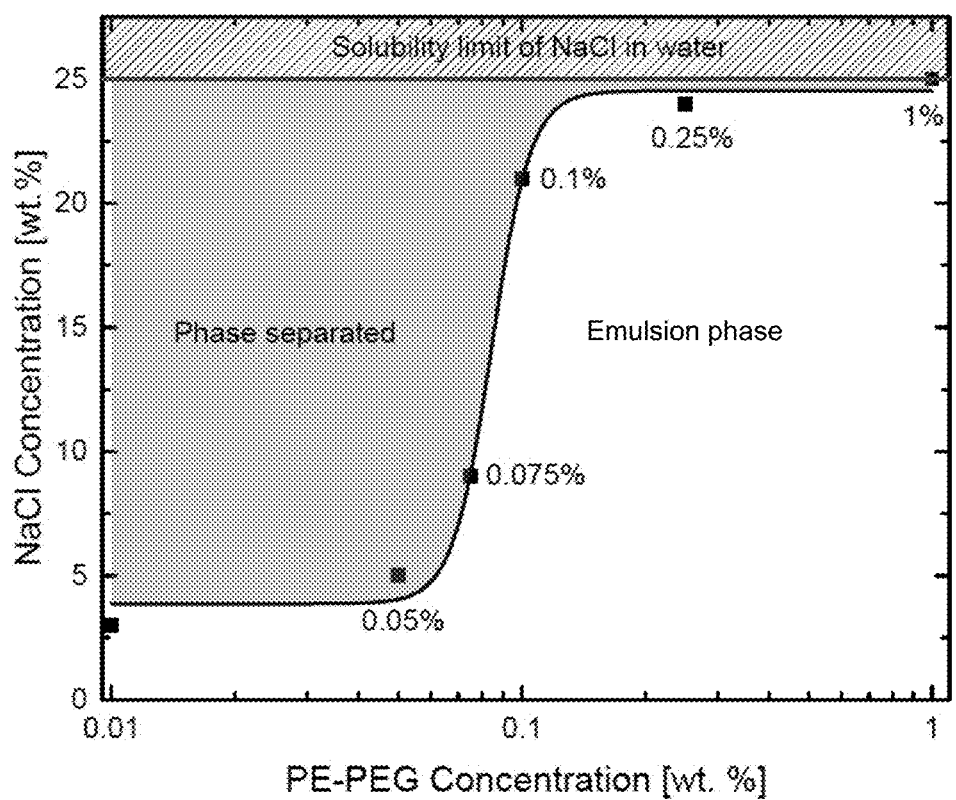
FIG. 7 illustrates a phase diagram for Samples 13-18 containing the crude oil emulsion in NaCl brine solutions.

The phase diagram for mixtures (Samples 13-18) containing the crude oil emulsion in NaCl brine solutions as described above with different concentrations of amphiphilic diblock copolymer (PE-PEG) was determined and is shown in FIG. 7. The mixtures with varying concentrations of amphiphilic diblock copolymer are shown below in Table 3.

TABLE 3

| Sample | wt % PE-PEG |
|---|---|
| 13 | 0.01 |
| 14 | 0.05 |
| 15 | 0.075 |
| 16 | 0.1 |
| 17 | 0.25 |
| 18 | 1.0 |

In FIG. 7, the top shaded region corresponds to salt concentrations that lie above the solubility of NaCl in water at 25° C. The grey region and white unshaded region represent, respectively, phase separated emulsions, and single phase emulsion-salt-diblock copolymer mixtures. The phase boundary is shown as a curved line.

Example 5b: Preparation of Sample 19—Injection Fluid Composition Comprising PU1191, an Amphiphilic Diblock Copolymer and Crude Oil Emulsion with NaCl Sample 19 was prepared by mixing a 5 wt % solution of polyurethane polymer, Rheovis® PU 1191 (obtained from BASF) having a plurality of hydrophobic groups with 1 wt % polyethylene-polyethylene glycol diblock copolymer (PE-PEG) (obtained from Sigma-Aldrich) and 7 wt. % NaCl in an aqueous crude oil emulsion containing about 0.10 wt % oil as prepared in Example 1.

Figure 8:
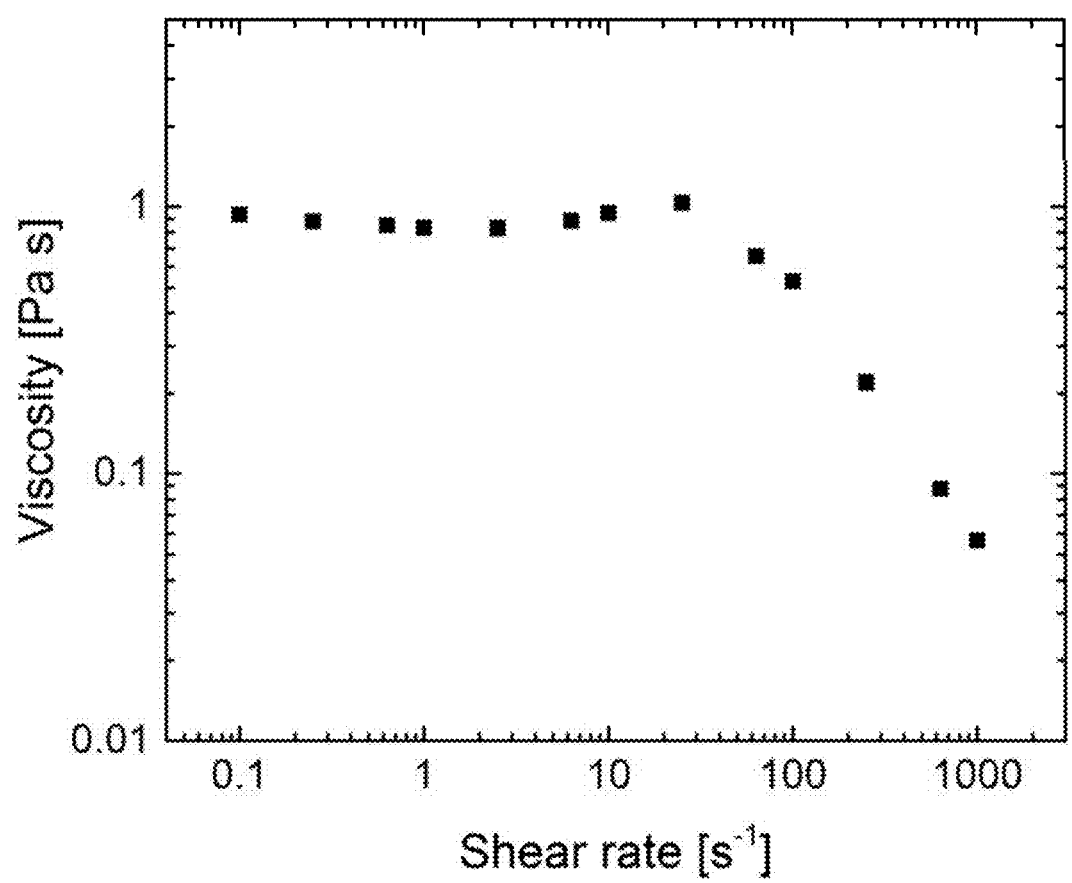
FIG. 8 illustrates viscosity vs. shear rate curves for Sample 19.

Viscosity was measured at increasing shear rates for Sample 19, as provided in FIG. 8. Viscosity measurements were made using an Anton Paar MCR 302 stress controlled rheometer with a double wall Couette fixture at 25° C.

Figure 9:
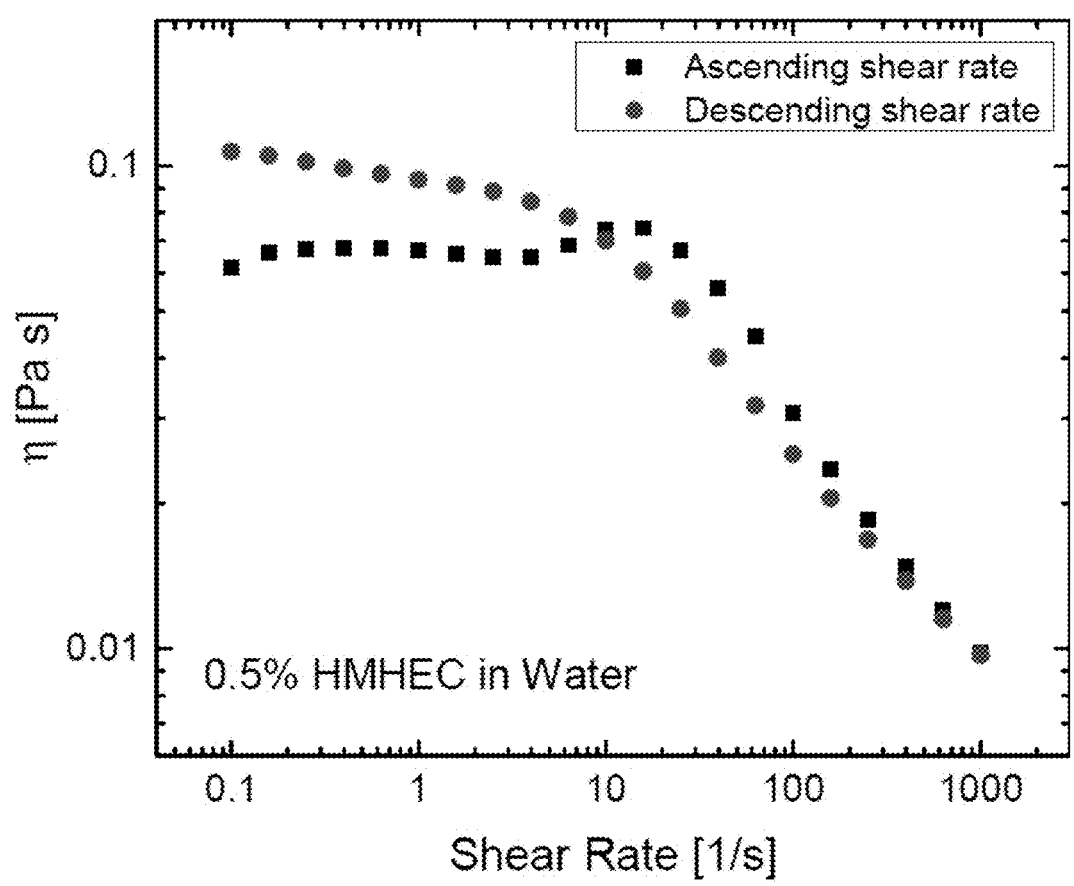
FIG. 9 illustrates viscosity vs. shear rate curves for Sample 20.

Example 6: Preparation of Sample 20—Infection Fluid Composition Comprising Cellulosic Polymer A 0.5 wt % solution of cellulosic polymer, hydrophobically modified hydroxyethyl cellulose (obtained from Natrosol) having a plurality of hydrophobic groups was added to deionized water and mixed to make Sample 20. As with Sample 1 and FIG. 3, FIG. 9 shows that Sample 20 is shear reversible. Increasing (boxes) and then decreasing (circles) the shear rate on the same sample generates similar viscosities and there is no shear degradation of Sample 20 up to shear rates of 1000 $s^{-1}$. The descending shear rate was performed immediately after the ascending shear rate, on the same sample. For Sample 20, the ascending and descending runs nearly overlap suggesting no observable shear degradation. In fact, the viscosity of the descending run was noticeably higher. Viscosity measurements were performed with an Anton Paar MCR 302 stress controlled rheometer with a double wall Couette fixture. Experiments were performed at 25° C.

The invention claimed is:

1. An aqueous injection fluid comprising:
   a polymer comprising hydrophilic moieties and a plurality of hydrophobic groups;
   an aqueous crude oil microemulsion, wherein the crude oil of the aqueous crude oil microemulsion has a total acid number (TAN) greater than about 0.4;
   a basic compound; and
   an amphiphilic diblock copolymer, wherein the amphiphilic diblock copolymer is selected from the group consisting of polyethylene-block-polyethylene glycol, polyethylene-block-polypropylene glycol, polyethylene glycol-block-polystyrene, polyethylene oxide-block-polycaprolactone, and a combination thereof;
   wherein the polymer is present in an amount of about 0.05 wt % to about 1.0 wt % and the crude oil is present in an amount of about 0.10 wt % to about 1.0 wt %.

2. The aqueous injection fluid of claim 1, wherein the crude oil has a TAN of at least about 1.5.

3. The aqueous injection fluid of claim 1, wherein the crude oil microemulsion comprises crude oil droplets having an average diameter of about 10 nm to about 100 μm.

4. The aqueous injection fluid of claim 1, wherein the polymer has a molecular weight of about 10,000 g/mol to about 2,000,000 g/mol.

5. The aqueous injection fluid of claim 1, wherein the polymer has a molecular weight of about 10,000 g/mol to about 1,000,000 g/mol.

6. The aqueous injection fluid of claim 1, wherein the hydrophobic groups are selected from the group consisting of a $C_8$-$C_{18}$ alkyl, an aralkyl, an alkylphenol, a haloalkyl, a quaternary ammonium halide and a combination thereof.

7. The aqueous injection fluid of claim 1, wherein the hydrophilic moieties are selected from the group consisting of an ethylenically unsaturated amide, an N-substituted derivative of the ethylenically unsaturated amide, an ethylenically unsaturated carboxylic acid, a sulfoalkyl ester of an unsaturated carboxylic acid, an aminoalkyl ester of an unsaturated carboxylic acids, a diallyl ammonium compound, a vinyl heterocyclic amide, a vinylaryl sulfonate, hydrolyzed acrylamide, non-hydrolyzed acrylamide, ethylene oxide, a monosaccharide, a urethane, and a combination thereof.

8. The aqueous injection fluid of claim 1, wherein the basic compound is selected from the group consisting of an alkali metal hydroxide, a carbonate, a bicarbonate, an ammonium salt, an amine and a combination thereof.

9. The aqueous injection fluid of claim 1 having a viscosity of about 10 cps to about 1,000 cps.

10. The aqueous injection fluid of claim 1 having a greater viscosity compared to a viscosity of an aqueous fluid comprising the polymer without the crude oil emulsion.

11. The aqueous injection fluid of claim 1 having substantially no shear degradation at a shear rate of up to about 1000 $s^{-1}$.

12. The aqueous injection fluid of claim 1, wherein no further surfactant agent is present besides the aqueous crude oil emulsion.

* * * * *